July 30, 1940.  R. L. BELL  2,209,380
BOMB DROPPING DEVICE
Filed Sept. 19, 1938  7 Sheets-Sheet 1
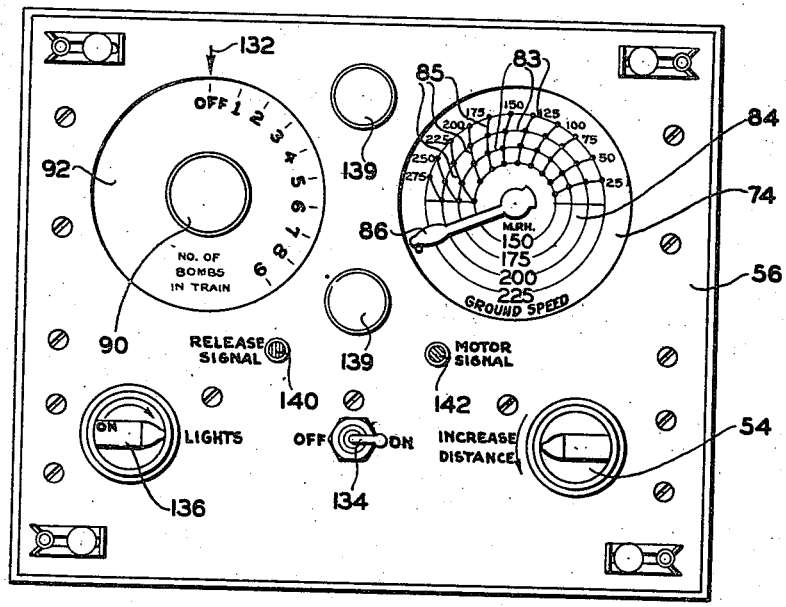
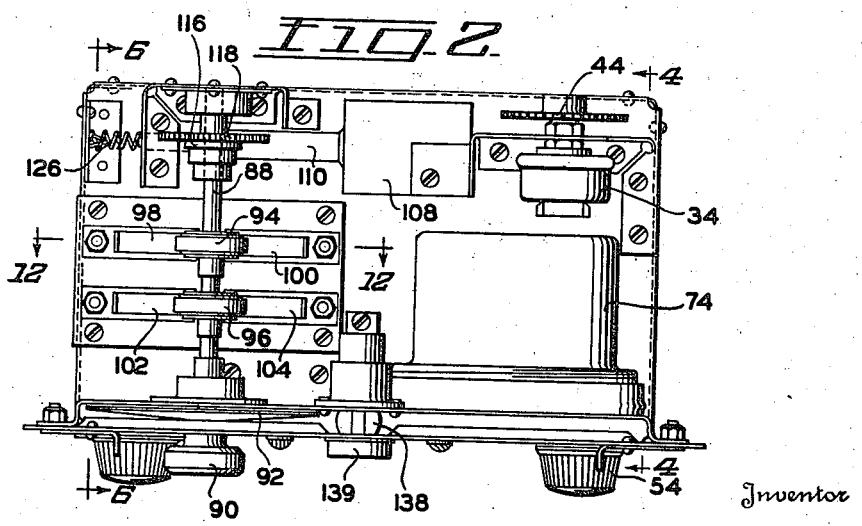
Inventor
RALPH L. BELL
By
Attorney

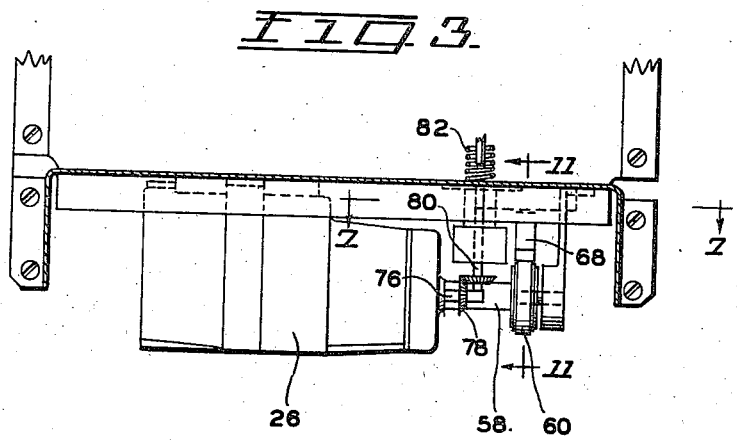
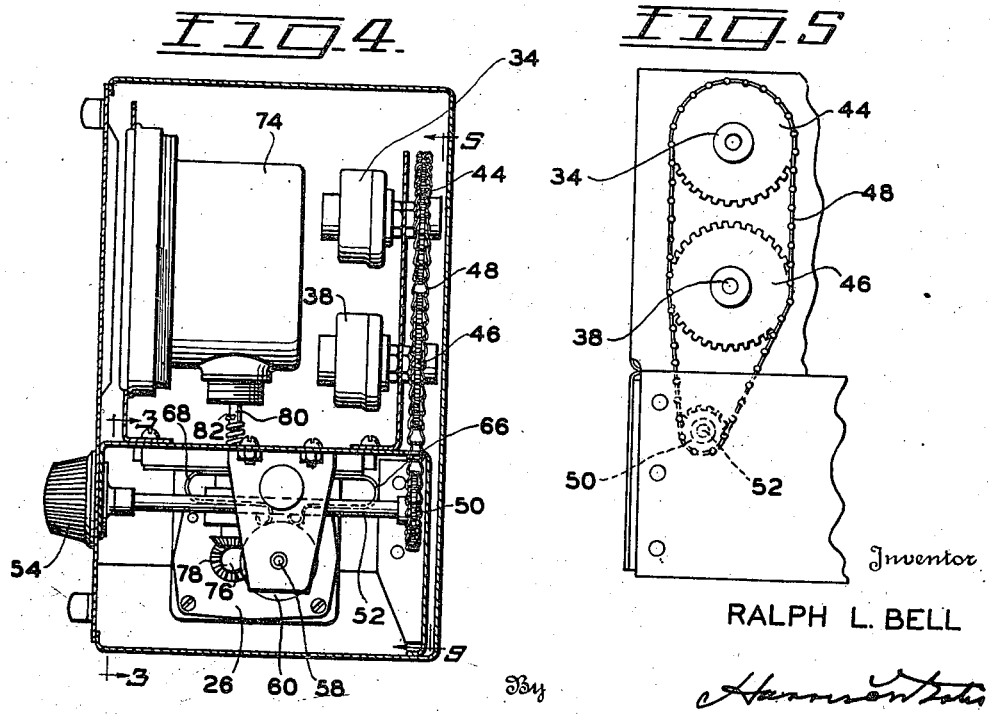

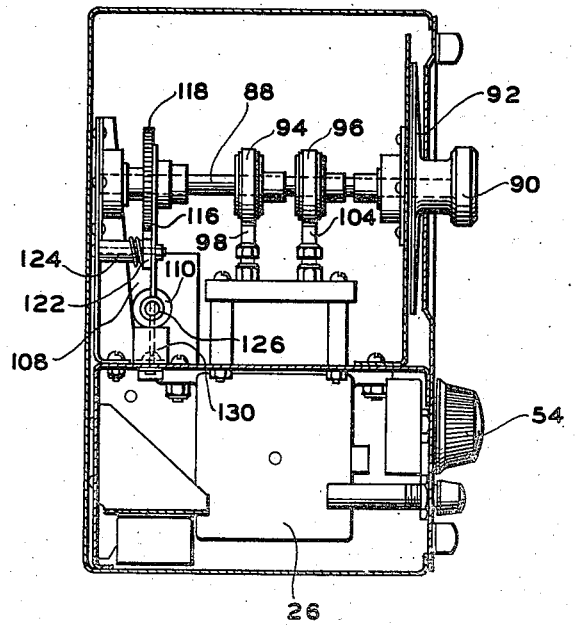
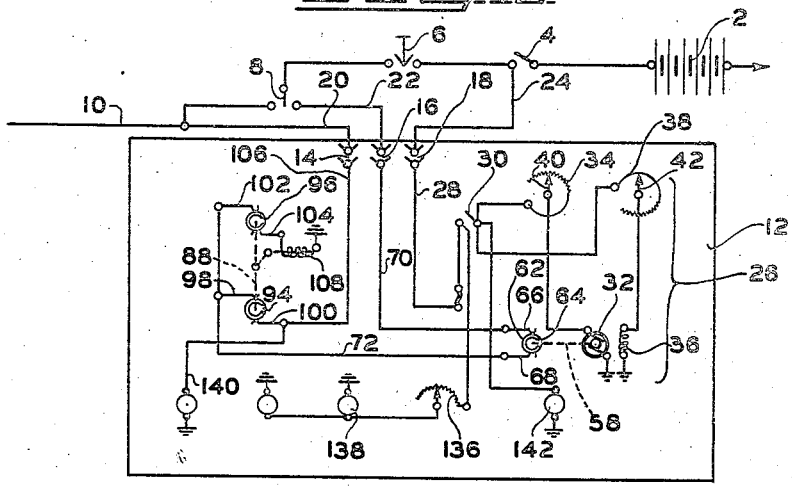

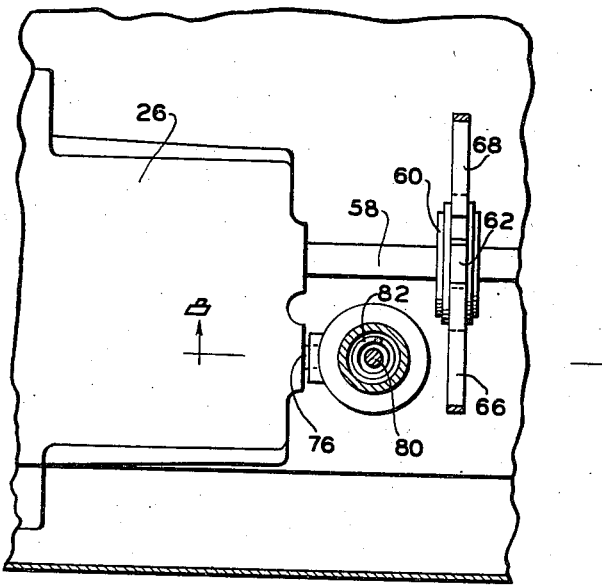
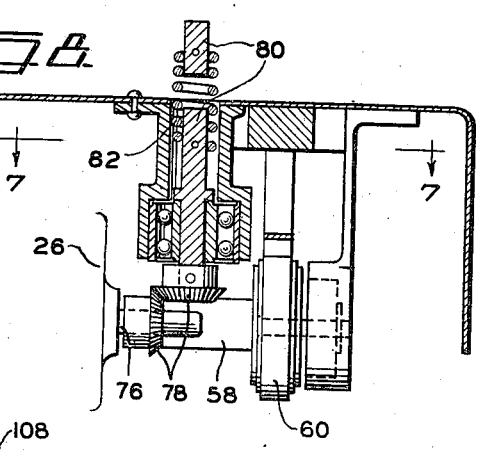
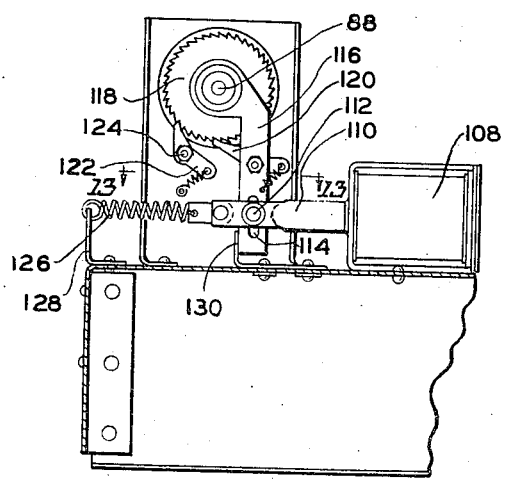

July 30, 1940.  R. L. BELL  2,209,380
BOMB DROPPING DEVICE
Filed Sept. 19, 1938  7 Sheets—Sheet 5
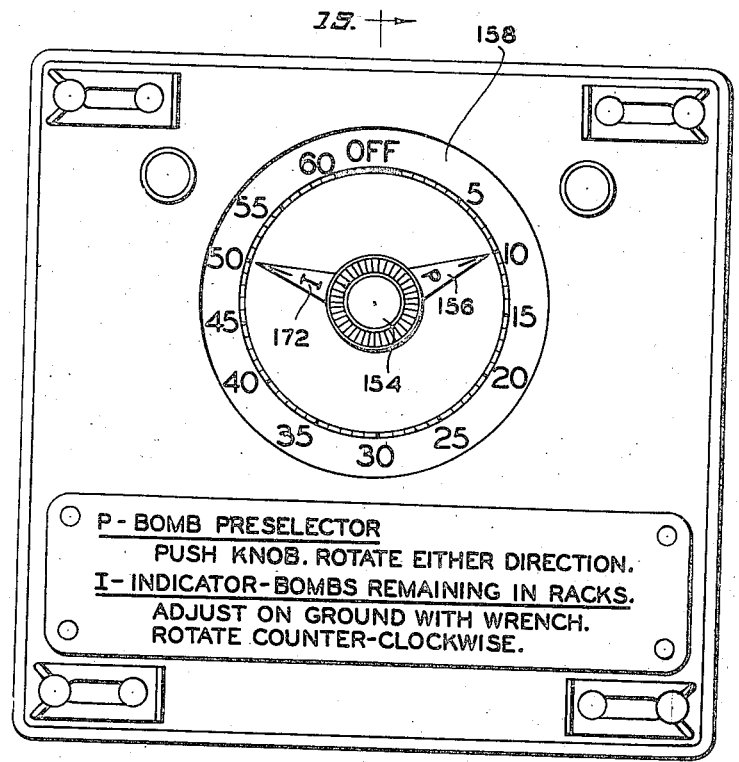
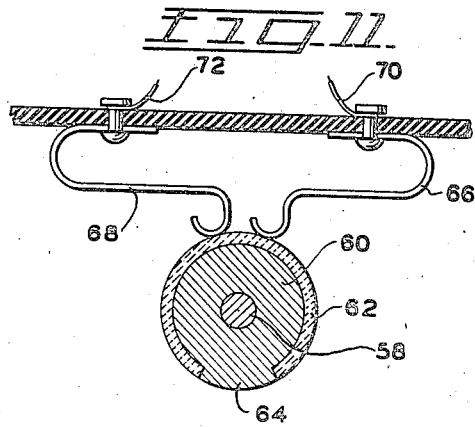
Inventor
RALPH L. BELL July 30, 1940.　　　　R. L. BELL　　　　2,209,380
BOMB DROPPING DEVICE
Filed Sept. 19, 1938　　　7 Sheets-Sheet 6
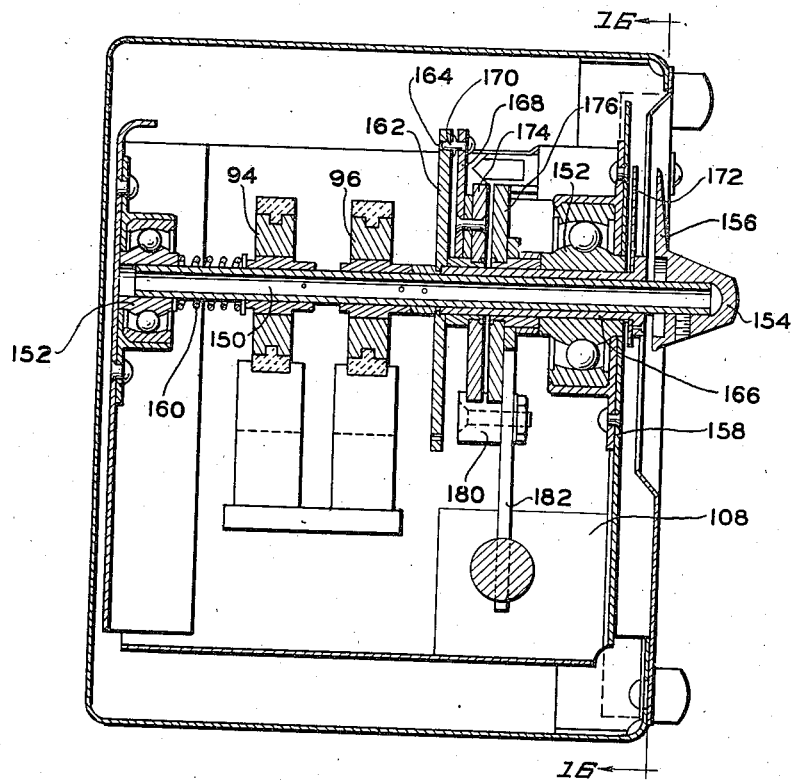
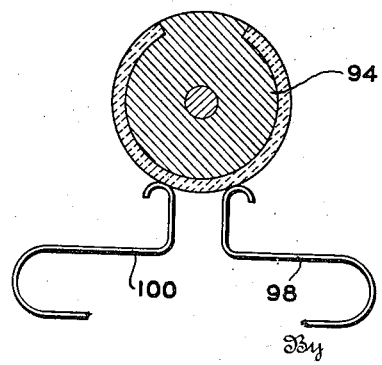
Inventor
RALPH L. BELL July 30, 1940.  R. L. BELL  2,209,380
BOMB DROPPING DEVICE
Filed Sept. 19, 1938  7 Sheets-Sheet 7

Inventor
RALPH L. BELL

By  Harrison Bates
Attorney

Patented July 30, 1940

2,209,380

UNITED STATES PATENT OFFICE 2,209,380

BOMB DROPPING DEVICE

Ralph L. Bell, Easpeburg, Md., assignor to The
Glenn L. Martin Company, Baltimore, Md.

Application September 19, 1938, Serial No. 230,732

21 Claims. (Cl. 89—1.5)

The present invention relates to a variable train release switch particularly adapted for the control of bomb dropping apparatus.

Broadly, the object of the invention is to provide an automatic device for transmitting a predetermined number of equally spaced impulses, with means for varying the space therebetween. It is particularly applicable to the transmission of electrical impulses.

One of the objects of the present invention is to provide a switch of this type which is of simple structure and yet operates with certainty and accuracy, and is useful for many purposes.

Another object is to provide an arrangement of this type with means to control the dropping of a series of bombs, and to indicate visually the number of bombs remaining in the series for which the device has been set which have not yet been dropped. In a modified form, means are also provided to show at any time the number of bombs remaining in the bomb rack.

Another object of the invention is to provide a mechanism which makes it possible to vary and to control automatically the space between the points at which successive bombs strike the earth when dropped by the device while indicating the spacing visually. Particularly, it is an object to provide such an arrangement in which the ground speed of the aircraft is taken into account.

Further objects of the invention will appear more fully from the following description, particularly when taken in conjunction with the accompanying drawings, which form a part thereof.

In the drawings:

Fig. 1 is a front view of a release switch made according to the invention;

Fig. 2 is a top plan view of the same;

Fig. 3 is a cross section on the line 3—3 of Fig. 4;

Fig. 4 is a cross section on the line 4—4 of Fig. 2;

Fig. 5 is a cross section on the line 5—5 of Fig. 4;

Fig. 6 is a cross section substantially on the line 6—6 of Fig. 2;

Fig. 7 is a fragmental cross section on the line 7—7 of Fig. 3;

Fig. 8 is a cross section on the line 8—8 of Fig. 7;

Fig. 9 is a detail elevation of the step by step mechanism;

Fig. 10 is a wiring diagram of the device;

Fig. 11 is a detail cross section on the line 11—11 of Fig. 3;

Fig. 12 is a cross section on the line 12—12 of Fig. 2;

Fig. 13 is a cross section on the line 13—13 of Fig. 9;

Fig. 14 shows in front view a modified form of mechanism for controlling and indicating the number of bombs dropped in a series;

Fig. 15 is a cross section principally on the line 15—15 of Fig. 14;

Figure 16:
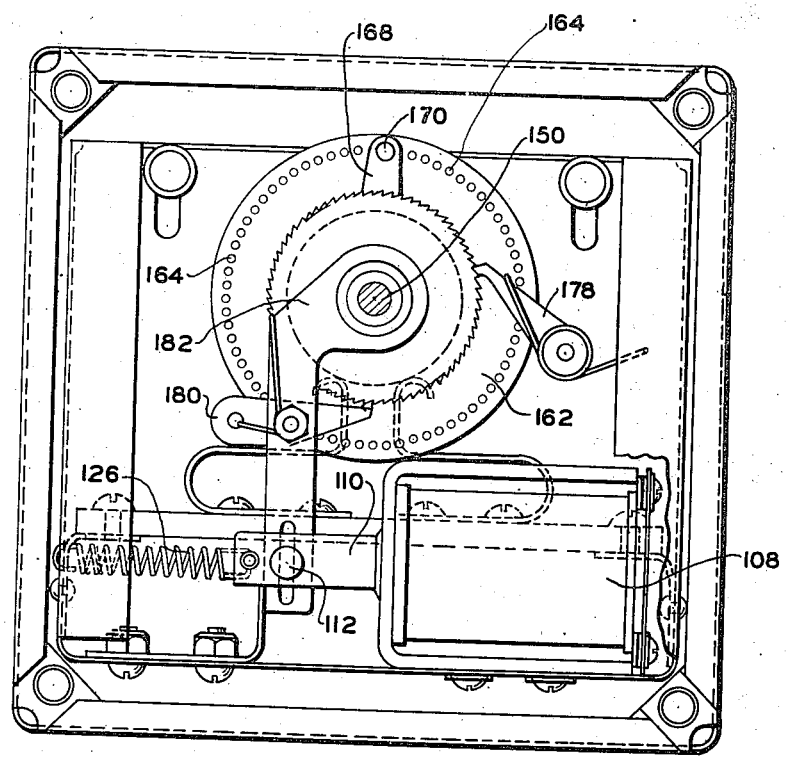
Fig. 16 is a cross section substantially on the line 16—16 of Fig. 15.

The object of the invention is to impart a series of electrical impulses to any well known type of bomb dropping mechanism which drops one bomb each time an electrical impulse is supplied thereto. In the past it has been known to supply such impulses either from a manually controlled switch or from a bomb sight in which an electrical impulse is emitted when the bomb sight is properly aligned with the target. The structure of the present device makes it possible upon the starting of an electrical impulse either from the bomb sight or manually to drop a series of bombs, of any desired number, at points equally spaced along the ground. The invention also makes it possible to vary both the number of bombs and the space between the points at which the bombs land at will, the mechanism being designed to take into account the ground speed of the aircraft in spacing the impulses to the bomb rack.

Referring now to Fig. 10, there is shown a source of current 2 connected through a master switch 4 to a firing or control key 6 and thence through a selector switch 8 to a lead 10 running to the bomb dropping mechanism. Obviously when the master switch 4 is closed and the selector switch 8 is in its left-hand position the closing of the key 6 will send an impulse directly to the bomb dropping mechanism of line 10 and the device then operates purely manually.

On the other hand, when the switch 8 is in its right-hand position current flows into the controlling device generally indicated at 12 which forms the subject matter of this invention and operates the same, as will be described hereinafter.

In order to utilize the device while permitting its removal from the aircraft when it is not needed, it is arranged so that it can be plugged in by plugs 14, 16 and 18 connected respectively to wires 20, 22, and 24, wire 20 being connected to wire 10, wire 22 to the right-hand contact of switch 8 and wire 24 to the terminal of master switch 4.

The device comprises a shunt wound electric motor 26 which is operated by current from plug 16 through a wire 28, and main switch 30. This current is supplied to the motor armature 32 through a rheostat 34 and to the motor field 36 through a field rheostat 38. Of course the other terminals of the armature and field windings are grounded.

In order to vary the speed of the motor 26, I provide means for selectively controlling the resistance of the armature and field rheostats 34 and 38. The movable contact members 40 and 42 respectively of these two rheostats are connected with sprocket wheels 44 and 46 both of which are engaged by a single chain 48. Chain 48 passes around a sprocket 50 on the end of a shaft 52 which is adapted to be manipulated by a handle or knob 54 on the front wall 56 of the device.

The main motor shaft 58 has mounted thereon a disc 60 provided (see Fig. 11) with a peripheral strip 62 of conductive material, this strip not extending completely around the wheel 60 and leaving a gap as at 64. Against the periphery of the disc are engaged spring contacts 66 and 68 connected respectively through line 70 to plug 16 and through line 72 to the mechanism to be described below.

It will be evident that as the motor turns the circuit from wire 70 to wire 72 will be interrupted once at each revolution, since space 64 is wider than the space between contacts 66 and 68. Furthermore, by varying the speed of the motor, which can be accomplished by turning knob 54, it will be possible to vary the time between electrical impulses sent into the line 72.

In order to determine the effect on the spacing of the bombs of this variation in the speed of the motor, I provide a tachometer 74 which is driven through an auxiliary motor shaft 76, bevelled gears 78 and an interrupted shaft 80 the parts of which are connected by a coil spring 82 (Figs. 7 and 8). The tachometer is provided with a dial 84 (Fig. 1) on which are a series of circles 83 marked to indicate different ground speeds, as, for instance, in miles per hour, and a series of curves 85 intersecting these circles and marked to indicate the spaces between bombs. If now the knob 54 is adjusted to vary the speed of the motor until the pointer 86 of the tachometer intersects that one of the circles which represents the ground speed of the aircraft, say the 200 miles per hour circle, at the point where such circle is cut by the curve 150, this will indicate that the speed of the motor is such that its electrical impulses occur at periods of time during which the plane is traversing 150 ft. with respect to the ground, or, in other words, that if a bomb is dropped at each impulse these bombs will strike the ground at distances of 150 ft. apart. The operator is thus able, knowing the speed of the aircraft, to set the speed of the motor such that the bombs will drop with the desired spacing.

The second part of the mechanism now to be described relates to the dropping of a number of bombs in succession, such number having been predetermined by the operator, and the spacing therebetween being determined by the arrangement previously described.

In the left-hand portion of the device (Fig. 1) I provide a shaft 88 adapted to be turned by a knob 90 carrying a dial 92, this dial being graduated from 0 to 9 or to any suitable number.

Mounted on the shaft 88 are two discs 94 and 96 generally similar to the disc 60 of Fig. 11 (see Fig. 12). The nonconducting spaces on discs 94 and 96 are aligned on shaft 88. Cooperating with these discs are contacts 98, 100 and 102, 104 respectively. Contacts 98 and 102 are connected to line 72. Contact 100 is connected through line 106, plug 14 and line 20 to line 10 leading to the bomb dropping mechanism.

Contact 104 is connected to the step-by-step mechanism shown in Fig. 9. This mechanism comprises a solenoid 108 connected to contact 104 and to the ground. The solenoid acts on a rod 110 carrying a pin 112 engaged in a slot 114 in lever 116 which is mounted to turn on shaft 88. Lever 116 extends through a slot 117 in rod 110 (Figs. 9 and 13). Frictionally mounted on shaft 88 is a ratchet gear 118. A pawl 120 pivoted on lever 116 engages the teeth of ratchet gear 118. A second pawl 122 mounted on a pivot 124 also engages ratchet 118. Suitable means are provided for holding these pawls in engagement with the ratchet. A coil spring 126 connected at one end to a fixed portion 128 and at its other to the rod 110 constantly urges the lever 116 towards the left in Fig. 9. A stop 130 limits the movement of the lever under the action of the spring 126.

Supposing now that it is desired to drop six bombs in succession. Knob 90 will be turned until the indication 6 on dial 92 comes opposite the ends 132 of the front wall 56. Assuming that the switch 30 is closed, as by handle 134, current will flow through the motor and cause the motor to run, and at the same time will flow through line 70, wheel 60, line 72, line 98, wheel 94, line 106 to line 10. At each rotation of the motor, this current is interrupted once. When the device is started, wheels 94 and 96 are set so that current can flow across them, while the nonconducting portions of their peripheries are spaced from the contacts by an angle equal to the angle between the 0 and 6 positions on the dial 92. As soon as current flows through wheel 60, solenoid 108 is energized and pulls rod 110 toward the right (Fig. 9). As the current is broken by wheel 60, the solenoid is deenergized and the rod 110 moves to the left, imparting a clockwise motion to wheel 118 and thereby to shaft 88. At the same time, this impulse of current has flowed through wheel 94 to line 10 and has caused the dropping of one bomb. At each interruption of current by the wheel 60, the solenoid is operated and released, and thus the dial 92 and the wheel 88 move step-by-step to the 0 position. When this position is reached, the insulating portions of wheels 94 and 96 are opposite the contacts, so that the current is broken. Therefore, no more impulses are sent to the line 10, nor is the solenoid 108 operated to move the shaft 88 any further.

It is thus apparent that the mechanism will drop the required number of bombs at the desired spacing on the ground, and then will cease to operate until it is reset to drop more bombs.

The circuit further includes a rheostat 136 for the control of panel lights 138 with covers 139, a release signal light 140 which is illuminated at each operation of the bomb release mechanism, and a motor signal light 142 which indicates that the switch 30 is closed and that the motor is operating.

In the mechanism shown by Figs. 14 to 16, means are provided not only to set the device for dropping a predetermined number of bombs in order, but also for indicating how many bombs remain available in the bomb rack at any time.

In this device, the wheels 94 and 96 serving to control respectively the bomb dropping mechanism and the step-by-step mechanism are utilized in the same manner as described above. These wheels are mounted on a shaft 150 longitudinally shiftable in bearings 152 and having at its end a knob 154 provided with a pointer 156 in front of the dial 158. A coil spring 160 engaging at one end against the bearing 152 and at the other against a plate resting against the hub of wheel 94 surrounds the shaft 150 and urges it constantly outward (to the right in Fig. 15).

Rigidly mounted on the shaft 150 is a disc 162 provided with a series of holes 164 arranged in a circle around the axis of the shaft. A sleeve 166 rotatably mounted on the shaft 150 has rigid therewith a lever 168 carrying at its end a pin 170 spaced the same distance from the axis of the shaft as the holes 164 and therefore engageable therein.

A pointer 172 is arranged on the sleeve 166 in front of the dial 158, this pointer preferably being mounted on the sleeve so that it can be turned with respect thereto if sufficient force is applied.

Rigid with the sleeve 166 are two ratchet discs 174 and 176, disc 174 being also pinned to lever 168. These discs are engaged by a pawl 178, spring pressed into contact therewith so as to limit their rotation in one direction. They are also engaged by a pawl 180 mounted on a lever 182, corresponding to lever 116 of Fig. 9, and operated by a pin 112, rod 110, solenoid 108 and spring 126. The pawls, however, as it will be noted, are arranged so that the wheels can be moved during the energization of the solenoid, while the wheels remain unmoved during the return of the solenoid core 10 under the action of spring 126.

The construction described above is operated in the following manner:

Assuming that at the start of the flight there are fifty bombs in the rack. The pointer 172 is moved by hand or in any other suitable manner until it is opposite the number 50 on the dial. The pointer 156 is at 0. Now when in flight it is desired to release ten bombs, the knob 154 is pressed in, so that shaft 150 slides against the force of spring 160 and moves disc 162 until holes 164 disengage pin 170. The lever is then turned until pointer 156 is opposite the number 10 on dial 158. This of course turns wheels 94 and 96, so that intermittent impulses from the motor may be transmitted to the bomb dropping mechanism and to the solenoid 108. When handle 154 is released, spring 160 moves shaft 150 toward the right (Fig. 13) so that another of holes 164 engages pin 170. Now at each rotation of the motor, as described above in connection with Figs. 1 to 13, solenoid 108 is operated and thus shifts sleeve 166 and therewith shaft 150 by one step. This movement of sleeve 166 simultaneously moves pointer 172 downward one step, while pointer 156 also moves counter-clockwise. When pointer 156 reaches 0, the solenoid will cease to be energized and therefore the movement will stop. At the same time it will be noticed that pointer 50 will likewise move down ten steps and will indicate that there are only forty bombs left in the rack.

While I have described herein one embodiment of my invention I wish it to be understood that I do not intend to limit myself thereby except within the scope of the appended claims.

I claim:

1. A device of the class described comprising means settable to a plurality of positions and incapable in one of said positions of transmitting impulses, means operable independently of the position of said first means for imparting intermittent impulses to said first means, and impulse responsive means operable when said first means is in a transmitting position by each impulse to move said first means to a different position in the direction of a non-transmitting position.

2. A variable train release mechanism comprising an electric motor, a circuit to supply current to said motor, a second electric circuit, means in said second circuit operated by said motor for periodically interrupting said second circuit, a second interrupting means only in said second circuit having a non-conducting position, and means controlled by operation of said first interrupting means to move said second interrupting means towards non-conducting position.

3. A variable train release mechanism comprising an electric motor, a circuit to supply current to said motor, a second electric circuit, means in said second circuit operated by said motor for periodically interrupting said second circuit so as to send periodic impulses therethrough means only in said second circuit movable to a plurality of positions in at least one of which said second circuit is interrupted, and means controlled by said impulses to move said second means at each impulse to a different position in the direction of said interrupting position.

4. In a device for transmitting intermittent impulses from a source of current to a bomb rack, an electric motor, interrupting means in the circuit between the source and the bomb rack driven by said motor, a tachometer connected to said motor to indicate the rate thereof, said tachometer including a cooperating dial and index, said dial having circles thereon representing different ground speeds and having curves intersecting said circles representing different lineal spacings between operations of said interrupting means, and means to vary the speed of the motor.

5. In a bomb release control mechanism for aircraft comprising a motor and means controlled by said motor to control the release of bombs, means to vary the speed of said motor, and a tachometer operably connected to said motor, said tachometer having a dial graduated to indicate horizontal spacing between bombs in accordance with the speed of the aircraft.

6. In a device of the character described, an electric motor, means to supply current to said motor, an electric circuit, means in said circuit operated by said motor for interrupting the circuit at each revolution of the motor, a movable member having conducting and non-conducting portions, contacts in said circuit spaced from each other in the direction of movement of and engaging said member, whereby in one position of said member said circuit is interrupted, and means operated by electrical impulses from said first means for imparting a step-by-step movement to said member upon each revolution of said first motor.

7. In a device of the character described, an electric motor, means to supply current to said motor, a circuit for conducting current from a source to a bomb release mechanism, means in said circuit operated by said motor for interrupting the circuit at each revolution of the motor, a wheel having a portion of its periphery formed of conducting material, a shaft on which said wheel is mounted, a second similar wheel on said shaft, contacts in said circuit engaging the periphery of said first wheel, whereby in one position of said first wheel said circuit is interrupted, contacts engaging the periphery of said second wheel, means connecting one of said second contacts to said circuit, a solenoid connected to the other of said second contacts, and means operated by said solenoid for imparting a step-by-step movement to said shaft upon each operation of said first interrupting means.

8. In a bomb release control mechanism for aircraft as claimed in claim 7, means to vary the speed of said motor, and a tachometer operably connected to said motor, said tachometer having a dial graduated to indicate horizontal spacing between bombs in accordance with the speed of the aircraft.

9. In a device of the character described, an electric motor, means to supply current to said motor, a circuit for conducting current from a source to a bomb release mechanism, means in said circuit operated by said motor for interrupting the circuit at each revolution of the motor, a wheel having a portion of its periphery formed of conducting material, a shaft on which said wheel is mounted, manual means to move said shaft, a dial and index relatively movable and one connected to said shaft for rotation therewith, a second similar wheel on said shaft, contacts in said circuit engaging the periphery of said first wheel, whereby in one position of said first wheel said circuit is interrupted, contacts engaging the periphery of said second wheel, means connecting one of said second contacts to said circuit, a solenoid connected to the other of said second contacts, and means operated by said solenoid for imparting a step-by-step movement to said shaft upon each operation of said first interrupting means.

10. In a device as claimed in claim 9, in which said index is connected to the shaft, a second index settable independently of said shaft, and means for connecting said second index to said shaft for movement therewith during rotation of said shaft by said solenoid.

11. A variable train release mechanism for use in aircraft comprising an electric motor, means to supply current to said motor, an electric circuit, means in said circuit operated by said motor for periodically interrupting said circuit so as to send periodic impulses therethrough, means in said circuit movable to a plurality of positions in at least one of which said circuit is interrupted, means controlled by said impulses to move said second means at each impulse to a different position in the direction of said interrupting position, means to vary the speed of said motor, and a tachometer operably connected to said motor, said tachometer having a dial graduated to indicate horizontal spacing between impulses in accordance with the speed of the aircraft.

12. In a device of the character described, an electric motor, means to supply current to said motor, an electric circuit, means in said circuit operated by said motor for interrupting the circuit at each revolution of the motor, a shaft, means on said shaft for breaking said circuit in one position thereof, a solenoid, means to energize said solenoid at each revolution of said motor, and means operated by said solenoid for imparting a step-by-step movement to said shaft towards circuit breaking position upon each revolution of said motor, said solenoid operating means being mounted on said shaft and having an inoperative position corresponding to the said circuit breaking position.

13. In a device of the character described, an electric motor, means to supply current to said motor, an electric circuit, means in said circuit operated by said motor for interrupting the circuit at each revolution of the motor, a shaft, means on said shaft for breaking said circuit in one position thereof, a solenoid, means to energize said solenoid at each revolution of said motor, means operated by said solenoid for imparting a step-by-step movement to said shaft towards circuit breaking position upon each revolution of said motor, said shaft having an index thereon, a sleeve on said shaft, a second index on said sleeve, manual means to turn said shaft, and means to adjust the angular relation of said sleeve and shaft.

14. In a device of the character described, an electric motor, means to supply current to said motor, an electric circuit, means in said circuit operated by said motor for interrupting the circuit at each revolution of the motor, a shaft, means on said shaft for breaking said circuit in one position thereof, a solenoid, means to energize said solenoid at each revolution of said motor, means operated by said solenoid for imparting a step-by-step movement to said shaft towards circuit breaking position upon each revolution of said motor, said shaft having an index thereon, a sleeve on said shaft, a second index on said sleeve, manual means to turn said shaft, and means to adjust the angular relation of said sleeve and shaft, said solenoid operating on said sleeve.

15. In a device of the character described, an electric motor, means to supply current to said motor, an electric circuit, means in said circuit operated by said motor for interrupting the circuit at each revolution of the motor, a shaft, means on said shaft for breaking said circuit in one position thereof, a solenoid, means to energize said solenoid at each revolution of said motor, means operated by said solenoid for imparting a step-by-step movement to said shaft towards circuit breaking position upon each revolution of said motor, said shaft having an index thereon, a sleeve on said shaft, a second index on said sleeve, manual means to turn said shaft, and cooperating coupling means on said sleeve and shaft to permit angular adjustment therebetween, said solenoid operating on said sleeve.

16. In a device of the character described, an electric motor, means to supply current to said motor, a circuit for conducting current from a source to a bomb release mechanism, means in said circuit operated by said motor for interrupting the circuit periodically during revolution of the motor, a wheel having a portion of its periphery formed of conducting material, a shaft on which said wheel is mounted, a second similar wheel on said shaft, contacts in said circuit engaging the periphery of said first wheel, whereby in one position of said first wheel said circuit is interrupted, contacts engaging the periphery of said second wheel, means connecting one of said second contacts to said circuit and means connected to the other of said second contacts for imparting a step-by-step movement to said shaft upon each operation of said first interrupting means.

17. In a device of the character described, an electric motor, means to supply current to said motor, an electric circuit, means in said circuit operated by said motor for interrupting the circuit periodically during revolution of the motor, a shaft, means controlled by said shaft for breaking said circuit in one position thereof, and means operated by said circuit interrupting means for imparting a step-by-step movement to said shaft towards circuit breaking position during revolution of said motor, said last means being mounted on said shaft and having an inoperative position corresponding to the said circuit breaking position.

18. In a device of the character described, an electric motor, means to supply current to said motor, an electric circuit, means in said circuit operated by said motor for interrupting the circuit periodically during revolution of the motor, a shaft, means controlled by said shaft for breaking said circuit in one position thereof, means operated by said circuit interrupting means for imparting a step-by-step movement to said shaft towards circuit breaking position during revolution of said motor, said shaft having an index thereon, a sleeve on said shaft, a second index on said sleeve, manual means to turn said shaft, and means to adjust the angular relation of said sleeve and shaft.

19. In a device of the character described, an electric motor, means to supply current to said motor, an electric circuit, means in said circuit operated by said motor for interrupting the circuit periodically during revolution of the motor, a shaft, means controlled by said shaft for breaking said circuit in one position thereof, means operated by said circuit interrupting means for imparting a step-by-step movement to said shaft towards circuit breaking position during revolution of said motor, said shaft having an index thereon, a sleeve on said shaft, a second index on said sleeve, manual means to turn said shaft, and means to adjust the angular relation of said sleeve and shaft, said shaft moving means operating on said sleeve.

20. In a device of the character described, an electric motor, means to supply current to said motor, an electric circuit, means in said circuit operated by said motor for interrupting the circuit periodically during revolution of the motor, a shaft, means controlled by said shaft for breaking said circuit in one position thereof, means operated by said circuit interrupting means for imparting a step-by-step movement to said shaft towards circuit breaking position during revolution of said motor, said shaft having an index thereon, a sleeve on said shaft, a second index on said sleeve, manual means to turn said shaft, and cooperating coupling means on said sleeve and shaft to permit angular adjustment therebetween, said shaft moving means operating on said sleeve.

21. In a device of the character described, an electric motor, means to supply current to said motor, an electric circuit, means in said circuit operated by said motor for interrupting the circuit periodically during operation of the motor, a movable member having conducting and non-conducting portions, contacts in said circuit spaced from each other in the direction of movement of and engaging said member, whereby in one position of said member said circuit is interrupted, and means operated by electrical impulses from said first means for imparting a step-by-step movement to said member upon each operation of said first means.

RALPH L. BELL.